May 14, 1940. K. EHRGOTT 2,200,265
ELECTRIC STEAM GENERATOR
Filed May 26, 1938 2 Sheets-Sheet 1

WITNESSES:

INVENTOR
Karl Ehrgott.
BY
ATTORNEY

May 14, 1940.　　　　K. EHRGOTT　　　　2,200,265
ELECTRIC STEAM GENERATOR
Filed May 26, 1938　　　2 Sheets-Sheet 2

WITNESSES:

INVENTOR
Karl Ehrgott.
BY
ATTORNEY

Patented May 14, 1940

2,200,265

UNITED STATES PATENT OFFICE 2,200,265

ELECTRIC STEAM GENERATOR

Karl Ehrgott, Wilkinsburg, Pa., assignor to Westinghouse Electric & Manufacturing Company, East Pittsburgh, Pa., a corporation of Pennsylvania Application May 26, 1938, Serial No. 210,190

4 Claims. (Cl. 219—39)

My invention relates to a steam generator and more particularly to an "instantaneous" continuously operable steam generator.

An object of my invention is to provide a continuous steam generator capable of delivering superheated steam in a minimum of time, such as 12 to 15 seconds, or less, after connecting the generator to a power supply.

A further object of my invention is to provide an "instantaneous" continuously operable steam generator capable of producing relatively large quantities of steam without having drops of moisture carried along with such steam.

A further object of my invention is to provide an "instantaneous" continuously operable steam generator comprising a water chamber and relatively larger steam chamber having a heater positioned therein, whereby any moisture in the steam will be quickly removed therefrom, ensuring the delivery of dry steam from the generator.

A further object of my invention is to provide an "instantaneous" continuously operable steam generator having an immersion heater adapted to be positioned within a relatively small volume of water so as to have a large percentage of contact area therewith to produce steam therefrom in a minimum time and with a minimum consumption of power, and adapted to be positioned within a relatively large volume of steam to supply the necessary amount of additional heat thereto to produce the desired dryness and degree of superheat thereof.

A further object of my invention is to provide a rugged, efficient, inexpensive, "instantaneous", continuously operable steam generator which may have the component parts thereof easily removable to facilitate periodic cleaning and inspection.

A further object of my invention is to provide a small "instantaneous" continuously operable steam generator capable of producing a continuous flow of dry superheated steam of a predetermined quality adapted for sterilizing purposes.

A further object of my invention is to provide an "instantaneous" continuously operable steam generator having a glass or metal envelope and adapted to be connected directly to a suitable water and power supply.

Other objects of my invention will either be pointed out specifically in the course of the following description of a device embodying my invention, or will be apparent from such description.

Figure 1:
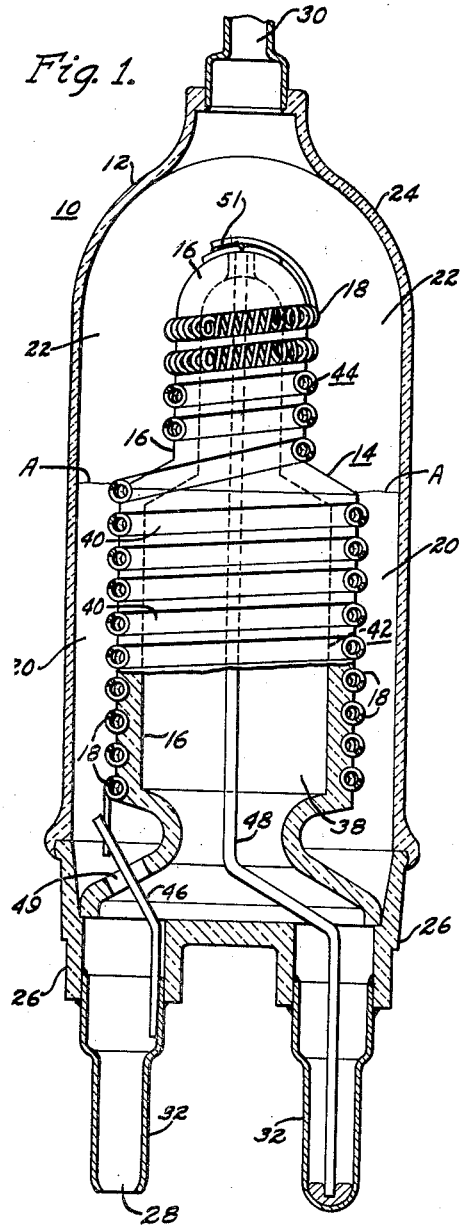
Figure 2:
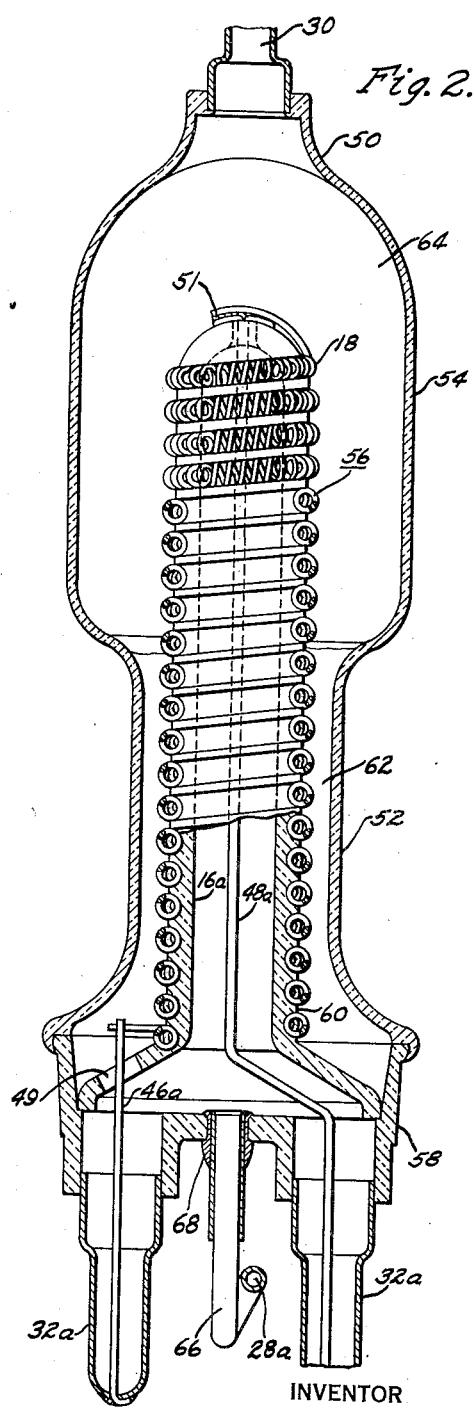
Figure 3:
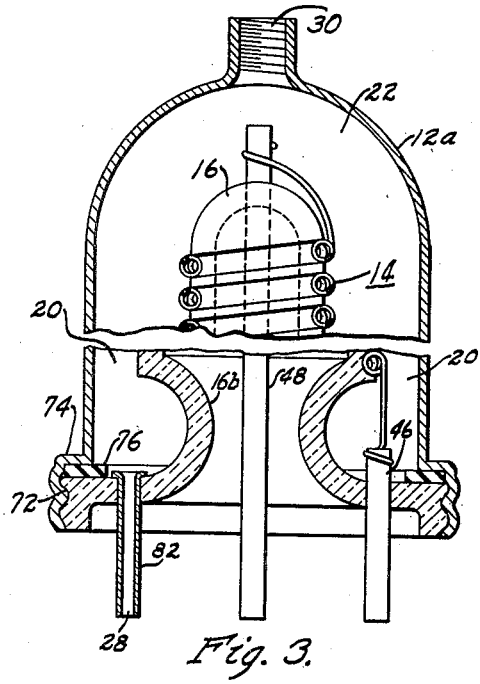
Figure 4:
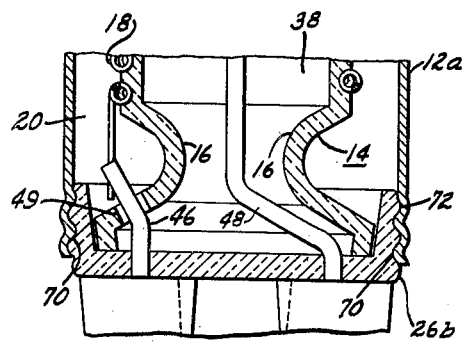
Figure 5:
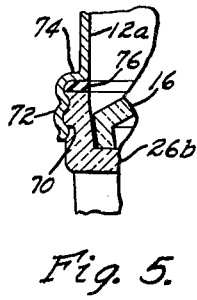
Figure 6:
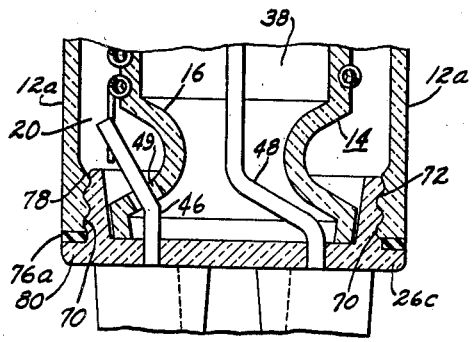

In the accompanying drawings:

Figure 1 is a sectional view of a device embodying my invention;

Figs. 2 and 3 are sectional views of modified forms of the device shown in Fig. 1; and Figs. 4, 5 and 6 are sectional views of removable base structures adapted to be used with the devices shown in Figs. 1 and 2.

Referring to Fig. 1, I show an "instantaneous" continuously operable steam generator 10 comprising an envelope 12 and an immersion heater 14 positioned therein, including a core 16 and a suitable heating element 18 disposed thereon, and a water chamber 20 and steam chamber 22 formed by the cooperation of the heater 14 with the envelope 12.

Generally, as hereinafter described in greater detail, the operation of the steam generator is substantially as follows: Water is introduced into the steam generator through the water port 28, associated with the base 26, to fill the water chamber 20. The prongs or terminals 32 may be operatively associated with a suitable power supply (not shown) so as to permit passage of current into the steam generator through the heating element 18 of the immersion heater 14. The heat produced thereby raises the temperature of the water therein to such a value that it will produce steam therefrom within a few seconds. The steam produced from the water then collects in the upper or steam chamber 22 where it is dried or superheated by means of that portion 44 of the heater 14 which extends into the steam chamber, and is then exhausted through the exhaust or steam port 30.

More specifically, as shown in Fig. 1, the envelope 12 comprises a main or central body portion 24 and a suitable cooperating base 26. The main body portion 24 is, in this instance, made of a suitable glass or quartz bulb with the base 26 fused therewith so as to form an integral seal. However, it is to be understood that, if desired, the main body portion of the steam generator 10 may be formed of any desirable metallic material, such as steel, as shown in Figs. 3 and 4, and as hereinafter described. Should the envelope 12 be formed of a metallic material, it is obvious that the inner surface thereof should be covered with a suitable insulating material capable of withstanding moisture and a high temperature, such as vitreous enamel.

The base 26, in the preferred construction shown in Fig. 1, is formed from a glass or quartz material, similar to the body portion 24, to permit its fusion with the main body portion 24. However, if it be desired to use a metallic envelope in lieu of the glass or quartz envelope, the base 26 may likewise be formed of a similar metallic material. It is to be understood, however, that the base may have a threaded engagement with the body portion 24, permitting such base to be readily removed therefrom, substantially as shown in Figs. 4, 5 and 6, and as hereinafter described.

The prongs or terminals 32 are rigidly attached to the base 26 and make a water-tight seal therewith. In addition, the prongs 32 are connected to or operatively associated with the heater 14 through the inleads 46 and 48, as hereinafter described. The prongs 32 are formed from a suitable electrical conducting material, such as copper and may be of any desired configuration so as to permit ready cooperation with a power supply (not shown).

The water port or inlet 28 is located at a convenient position in the base 26 to permit the supply of water to be delivered through the base to the water chamber 20 from a suitable source of supply (not shown). The water port 28, in the preferred form, shown in Fig. 1, is located within one of the prongs or terminals 32 which is to be connected to the grounded terminal of the power supply. In other words, the prong 32, in this instance, performs a dual function; namely, acts as a water inlet tube having a water-tight seal with the base, and as an electric terminal operatively associated with the heater 14.

However, if desired, a water port 28a may be positioned or located directly in the bottom part of the base 26 by means of a tube 66, substantially as shown in Fig. 2. The tube 66 is rigidly attached to the base 58 by means of a sealing device 68 to form a water-tight seal therewith in any well known manner. If desired, the water-inlet 66 may be constructed and attached to the base similarly to the prongs 32. The base will then have two prongs adapted to be associated with a power supply and a third prong adapted to be associated with a water supply.

In the event of transmitting water into the steam generator of Fig. 1, the water proceeds through the port 28, the base 26 and through suitable aperture 49 in the core 16 into the water chamber 20, which is preferably filled up to level A. The water flow is then set to maintain the desired volume in the water chamber as portions thereof are evaporated or converted into steam with the continued operation of the steam generator. In other words, the amount of water entering through the port 28 is a variable quantity, depending upon the rate of evaporation of the water in the water chamber.

The immersion heater 14 comprises a hollow double-diameter core 16 and a heating element 18 wound thereon. The core 16 is preferably formed of a ceramic material which has a very low heat conductivity. The lower the conduction of heat through the core, the more efficient will be the operation of the generator, as hereinafter described. It is, therefore, apparent that any other suitable material may be used in place of the preferred ceramic material providing such material is a non-electrical conductor, a low heat conductor and can withstand shock due to sudden temperature changes.

The core 16 is, in the preferred form, as shown in Fig. 1, of a somewhat irregular shape having a comparatively large diameter water-heating lower portion 42 and a relatively smaller diameter steam-heating upper portion 44. The diameter of the water-heating portion 42 is a suitable amount less than the inside diameter of the main or central body portion of the envelope 12. A small annular space or water chamber 20 is thus provided between the water-heating portion 42 of the heater 14 and the envelope 12.

The diameter of the steam-heating portion 44 of the core 16 is considerably smaller than the diameter of the water-heating portion 42. Accordingly, inasmuch as the main body of the envelope is of a substantially uniform diameter, as shown in Fig. 1, this construction results in a somewhat larger annular space between the upper or steam-heating portion 44 of the heater 14 and the upper inner surface of the main body of envelope 12. In addition the small steam-heating portion 44 provides a relatively small amount of exposed heater 18 in the steam chamber 22. A comparatively large volume steam chamber 22 is thus provided, which cooperates with the water chamber 20 and heater 14 substantially as hereinafter described.

The core 16 may be hollow having a centrally located irregularly shaped aperture 38 therein, which follows substantially the configuration of the outer surface of the core 16. This construction results in the core 16 having substantially a uniform thickness throughout. In addition, a helically-wound groove 40 is formed or positioned in the outer surface of the core 16 to permit the heating element 18 to be positioned therein, as hereinafter described.

The heating element 18 is, in this instance, a helically coiled bare resistance wire. The heating element 18 is preferably helically coiled to afford maximum contact with the water and steam, and to reduce the contact with the core to a minimum. This then ensures a maximum amount of heat being available for the useful operation of the steam generator. The resistance wire may be composed of any suitable material, such as any well known nickel-chromium resistance alloy, which will not readily deteriorate as it operates in the boiling water and steam. Inasmuch as the operating efficiency of the generator depends upon a maximum efficiency of heat conduction within a minimum amount of time, after being associated with a power supply, it follows, that the use of a bare heating element, in direct contact with the water and steam, will afford the best results. However, it is to be understood that the conductor forming heating element 18 may have any other suitable configuration thereof.

The heating element 18 is wound about the core 16 within the helical groove 40. The heating element is then rigidly attached to the core 16 through suitable cooperating in-leads 46 and 48. The in-leads 46 and 48 are rigidly attached at their lower ends to the respective prongs 32, as by soldering, to afford a suitable connection therewith, the in-lead 46 being adapted to extend through the aperture 49 in the base of the core 16. The lower end of heating element 18 is then rigidly attached in any suitable manner to the upper or free end of the in-lead 46 which extends above the base of core 16. The in-lead 48 is rigidly attached, as by soldering, to the other prong 32 and extends upwardly through the central aperture 38 of core 16 and out through the upper end of such core where it is suitably rigidly attached to the upper end of the heating element 18. The upper end of in-lead 48 is, preferably, split or bifurcated and the bifurcations thereof folded over upon the upper end of the core 16, substantially as shown at 51 in Figs. 1 and 2. The heating element 18 is then attached to the bifurcations, preferably by silver solder. It is, therefore, apparent that the in-leads 46 and 48 rigidly attached at their lower ends to a suitable power connecting means and at their upper ends to the ends of the heating element 18 afford suitable electrical connection for such heating element, and also rigidly attach such heating element to the core 16. In addition, the bifurcations of in-leads 48, being folded over upon the core 16, hold such core in place upon the base 26.

By having the in-lead 48 positioned within the aperture 38 of the core 16, electrolytic action between the heating element 18 and such in-lead will be substantially prevented.

The cooperative action of the water-heating portion 42 of heater 14 and the envelope 12 produces a comparatively small volume water chamber 20 as hereinabove described. This feature, combined with the coiled heating element 18, results in the heating element having large-area direct contact with a relatively thin sheet of the water passing through the water chamber, thus causing the water to be vaporized with a minimum amount of power consumption and a minimum time. Accordingly, it is obvious that, with the heater 14 and water chamber 20 cooperatively associated as hereinabove described, a steady stream of water may be introduced into the generator and be converted into steam within a few seconds. It is understood that as the volume of water in the water chamber 20 is made smaller, with respect to the portion of heating element therein, the length of time necessary to vaporize such water will be proportionately decreased.

As the water vaporizes or is converted into steam, such vapor or steam expands and requires an increased space with respect to the volume of water from which it was formed. The relatively large steam chamber 22, positioned above the water chamber 20 and produced by the cooperation of the reduced-diameter steam-heating portion 44 of heater 14 and the envelope 12 permits the steam to expand therein as it is produced. In addition, the steam chamber 22, in cooperation with the steam-heating portion 44 of heater 14, dries and superheats the steam and prevents the exhausting of drops of moisture from the envelope along with the steam, as hereinafter described.

The steam chamber 22, which is relatively large in comparison with the small water chamber 20, permits the steam as it is produced in the water chamber 20 to expand in a normal manner without causing any undue agitation on the surface of the exposed water. This reduction or elimination of undue surface agitation of the water in the water chamber 20 eliminates the undesirable tendency for the water to bubble or to be blown into the steam chamber. Moreover, due to the operation of the upper or steam-heating portion of the heater 14 within the steam chamber 22, the heat produced by such steam-heating portion 44 immediately transforms any water which may be conveyed into the steam chamber 22 into steam. In addition, the steam-heating portion 44 completely dries and superheats the steam located thereabout. The degree of superheat produced by this heating portion depends upon the number of turns of the heating element exposed in the steam chamber 22.

It is to be understood that as the number of exposed turns of the heating element 18 on the steam-heating portion 44 of the heater 14 is increased, the degree of superheat of the exhausted steam is likewise increased. It, therefore, follows that the number of exposed turns of the steam-heating portion 44 may be increased or decreased depending upon the desired degree of superheat.

It is, therefore, obvious that the small-volume annular water chamber 20 positioned between the heater 14 and the envelope 12 results in a relatively large contact area between the water therein and the heating element 18. This condition ensures that steam will be produced from the water in a minimum amount of time with a minimum of power consumption. In addition, it is obvious that the relatively large steam chamber 22 permits the steam produced thereby to freely correct therein, and, due to the cooperation of the steam-heating portion 44 of the heater 14, to ensure the proper dryness or degree of superheat of such steam before it is exhausted from the exhaust port 30.

If desired, the steam generator may have an irregular shaped envelope 50, as shown in Fig. 2, having a small water-heating portion 52 and a relatively larger steam chamber portion 54, and a substantially straight or uniform cylindrical shaped heater 56 located therein. The envelope 50 may be formed of a glass or quartz material or of a suitable metallic material, as hereinabove described, and may cooperate with a base 58 similar to the cooperation of envelope 12 and base 26, as hereinbefore described. Terminals 32a, similar to terminals 32, are operatively associated with the base 58. In addition, the water-port 28a is operatively associated with base 58.

The heating element 56 comprises in this instance a ceramic core 16a of low heat conductivity, substantially as hereinabove described, having, however, a uniform cylindrical shape with a helical groove positioned therein to receive the heating element 18. The heating element 18 is in this instance rigidly attached to the core 16a by means of suitable in-leads 46a and 48a, substantially as hereinabove described. The water chamber 62, in this instance, is formed by the cooperation of the heating element 56 and the small diameter water-heating portion 52 of the envelope 50. The space between the heater 56 and the envelope 50 results in a small annular cylindrical water retaining chamber 62 which corresponds to the water chamber 20, as hereinabove described. This construction ensures a large contact area between the heater 18 and the water positioned within or passing through the water chamber 62.

In addition, a larger volume steam chamber 64 is produced by the cooperative action of the upper or steam-heating portion of the heater 56 and the relatively large diameter steam chamber portion 54 of the envelope 50. This construction in turn permits the steam produced in the water chamber 62, due to the cooperative action of the heating element 56 and the water located in the chamber 62, to expand freely into the steam chamber 64. The upper or steam-heating portion of the heater 56 then dries and superheats this steam substantially in the manner hereinabove described for the preferred construction of the steam generator.

It is, therefore, apparent that, regardless of whether the diameter of the core of the water-heater portion of the immersion heater be large with respect to the diameter of the steam-heating portion, with the diameter of the envelope remaining constant; or with the diameter of the heater remaining constant with the diameter of the water chamber portion of the envelope being relatively reduced with respect to the larger steam-heating portion thereof, such water-heating chamber will be relatively smaller than the steam-heating chamber. Accordingly, the small volume water chamber 20 or 62, in cooperation with the heater therein, will enable steam to be produced in a minimum time with a minimum power consumption, and the large steam chamber 22 or 64, in cooperation with the heater located therein, will enable such steam to be superheated before being exhausted therefrom.

With continued operation of the steam generator, the insoluble impurities, such as the carbonates, will be precipitated out of the water. These impurities will then settle to the bottom of the water chambers 20 or 62. The presence of these impurities will not harm the operation of the generator unless and until they pile up and bridge adjacent turns of the heating element 18. Under such conditions, the impurities greatly reduce the conduction of heat between the element and the water at the bridged area. Such a condition will cause the element 18 to overheat at such area, and, if continued, to eventually rupture, causing the generator to fail. It, therefore, follows that to ensure a long life of the generator, it should be capable to being readily cleaned. This result can be accomplished by flushing water in through the exhaust port 30, of the devices shown in Figs. 1 and 2, and out through the water port 28 or 28a. This flushing action will carry out all the impurities through the water port. However, to ensure a perfect cleaning operation and to afford means for close-inspection and replacement of the heater 14, when necessary, the envelope should be capable of being removed from the base and heater. This result may be accomplished by having a threaded engagement between the envelope and the base or core, substantially as shown in Figs. 3, 4, 5 and 6, and as hereinafter described.

The base 26b, for example, may have a plurality of threads 70 to cooperate with the threaded portion 72 of envelope 12a. The threaded portion 72 of the envelope is positioned at the lower end of the envelope regardless of whether it be metal or glass, substantially as shown in Figs. 4, 5 and 6.

Inasmuch as the generator operates at substantially atmospheric pressure, the envelope may be directly threaded upon the base without the use of a gasket, substantially as shown in Fig. 4. However, if it be desired to use a gasket, envelope 12a may be flanged out at the bottom, as shown at 74 in Fig. 5, and a gasket 76 positioned between the flange 74 and the base 26b. Or, if desired, the threaded portion 72 of envelope 12a may be positioned on an inwardly extending portion 78, as shown in Fig. 6. A gasket 76a may then be positioned between the envelope 12a and an outwardly extending annular lip 80 or base 26c.

It, therefore, follows that with the envelope 12a of the steam generator being removably attached to the base 26b, such envelope may be readily removed without affecting the connection to the heater 14. This construction permits the generator to be readily taken apart and cleaned or periodically inspected. In addition, the ability to remove the envelope and have access to the heater 14 permits an operator to replace an inoperative heater without the necessity of installing a complete new steam generator.

It will be understood that a threaded base, as described, may be employed with the type of generator shown in Fig. 2, if desired.

If desired, the steam generator may be constructed without a base, substantially as shown in Fig. 3, the core 16b functioning, in this instance, as both a base and heater core. To permit the construction of a generator in this manner, the core must be composed of high-grade ceramic material, which will not crack under the tremendous temperature variations between cold water and superheated steam, and which will be capable of effective sealing with the metallic in-leads 46 and 48 and the water inlet tube 82.

With the steam generator constructed in such a manner, it is obvious that the generator will operate substantially as hereinabove described. In addition, the envelope 12a may have a threaded engagement with the core 16a substantially as shown in Fig. 3 and as hereinabove described.

When desiring to operate the steam generator, a water supply (not shown) is connected to the water port 28, for example, and the prongs or terminals 32 are operatively associated with a power supply (not shown). The heater in the water chamber 20 will thereupon heat the water therein and produce a wet steam which will expand into the steam chamber 22. Moreover, the flow of water in the generator will be of such an amount as to maintain substantially a constant volume therein. The water entrained within the steam chamber 22 will then dry out and the steam therein will be superheated to the desired value, depending upon the number of exposed turns of heating element therein. The dry steam will then be exhausted from the device through port 30. With continued operation of the generator, the carbonates and other insoluble impurities will be collected at the bottom of the water chamber. The envelope 12a may be readily removed and the generator cleaned, whereupon the generator may be again operated, delivering superheated steam from the exhaust port 30 within a few seconds after being connected to the power supply.

Various other modifications may be made in the device embodying my invention without departing from the spirit and scope thereof, and I desire, therefore, that only such limitations shall be placed thereon as are imposed by the prior art and the appended claims.

I claim as my invention:

1. A steam generator comprising, in combination, an envelope, and an immersion heater adapted to be positioned therein, said heater including a core and a heating element wound thereabout, the core and associated heating element having a relatively large diameter water-heating portion and abruptly changing in mid portion to a smaller diameter steam-heating portion.

2. A steam generator comprising, in combination, an envelope including a water chamber portion for retaining water to be heated and a steam chamber for drying or superheating the steam, an immersion heater positioned within the envelope having a portion thereof in the water chamber and a portion in the steam chamber, and means exterior the envelope for connecting the heater to a power supply, said means comprising prongs attached to the envelope, and means comprising one of said prongs for connecting the generator to a suitable water supply.

3. A steam generator comprising, in combination, an envelope, a heater positioned within the envelope, said heater including a core and a heating element wound on said core, said core being hollow and having an opening adjacent one end of said heater, a conductor extending through the hollow portion and opening of said core, said conductor being bifurcated at said opening, said heater being connected to the bifurcated ends of said conductor.

4. A core for an immersion heater for steam generators comprising a cylindrical body of ceramic material having a top portion of much smaller diameter than the bottom portion, and an abrupt change from the one diameter to the other diameter at the midportion thereof, and means on said top and bottom portions for supporting a heater wire helically wound thereon.

KARL EHRGOTT.